(12) United States Patent
Resetco et al.

(10) Patent No.: US 11,524,515 B2
(45) Date of Patent: Dec. 13, 2022

(54) THERMOCHROMIC DYE COMPOSITIONS AND METHOD FOR PREPARING SAME

(71) Applicant: Xerox Corporation, Norwalk, CT (US)

(72) Inventors: Cristina Resetco, Toronto (CA); Kentaro Morimitsu, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 452 days.

(21) Appl. No.: 16/376,261

(22) Filed: Apr. 5, 2019

(65) Prior Publication Data
US 2020/0316975 A1    Oct. 8, 2020

(51) Int. Cl.
| | |
|---|---|
| *B41M 5/28* | (2006.01) |
| *B41M 5/333* | (2006.01) |
| *B41M 5/337* | (2006.01) |
| *B41M 5/323* | (2006.01) |

(52) U.S. Cl.
CPC .......... *B41M 5/284* (2013.01); *B41M 5/3333* (2013.01); *B41M 5/3375* (2013.01); *B41M 5/323* (2013.01); *B41M 5/3372* (2013.01)

(58) Field of Classification Search
CPC .. B41M 5/284; B41M 5/3333; B41M 5/3375; B41M 5/3372; B41M 5/323
See application file for complete search history.

(56) References Cited

U.S. PATENT DOCUMENTS

| | | | | |
|---|---|---|---|---|
| 3,672,842 A | * | 6/1972 | Florin | G01N 31/22 106/31.47 |
| 4,149,852 A | * | 4/1979 | Tiru | G01N 31/221 436/163 |
| 4,344,909 A | * | 8/1982 | De Blauwe | B29C 61/06 264/230 |
| 5,464,470 A | * | 11/1995 | Brachman | C09D 13/00 106/31.08 |
| 6,139,779 A | | 10/2000 | Small et al. | |
| 6,494,950 B1 | * | 12/2002 | Fujita | B41M 5/305 106/499 |
| 8,569,208 B1 | | 10/2013 | Ribi | |
| 2013/0172181 A1 | * | 7/2013 | Kwan | B41M 5/287 503/201 |
| 2016/0376458 A1 | * | 12/2016 | Kim | B41M 5/284 428/426 |

* cited by examiner

*Primary Examiner* — Gerard Higgins
(74) *Attorney, Agent, or Firm* — Marylou J. Lavoie, Esq. LLC

(57) ABSTRACT

A thermochromic composition including a dye molecule; a matrix, wherein the matrix comprises a material having a defined melting point; and an optional developer. A process for preparing a thermochromic composition, including providing a dye; heating a matrix above its melting point; adding the heated matrix to the dye until the dye dissolves in the matrix; optionally, adding a developer; wherein the thermochromic composition exhibits a first color at a first temperature and a second color at a second temperature; wherein the first color and the second color are different; and wherein the first temperature and the second temperature are different.

10 Claims, No Drawings

THERMOCHROMIC DYE COMPOSITIONS AND METHOD FOR PREPARING SAME

BACKGROUND

Disclosed herein is a thermochromic composition comprising a dye molecule; a matrix, wherein the matrix comprises a material having a defined melting point; and an optional developer.

Also disclosed is a process for preparing a thermochromic composition, comprising of providing a dye; heating a matrix above its melting point; adding the heated matrix to the dye until the dye dissolves in the matrix; optionally, adding a developer; wherein the thermochromic composition exhibits a first color at a first temperature and a second color at a second temperature; wherein the first color and the second color are different; and wherein the first temperature and the second temperature are different.

Thermochromic dyes are sensitive to temperature and can change color when heated or cooled at a pre-determined activation temperature that triggers the color change. Thermochromics are used as an indicator for temperature in applications such as storage of food and pharmaceuticals, safety, and interactive marketing of products. Different types of products require customized and tunable thermochromic dyes that match the product requirements and use patterns. Various applications of thermochromics in commercial products require different colors that are compatible with the application and user friendliness, such as branding, safety indicators, and signage. For example, blue color is typically associated with cold temperature, while red color is typically associated with hot temperature.

Typical commercial color changing inks are multi-component systems, such as microcapsules with leuco dyes.

U.S. Pat. No. 6,139,779, which is hereby incorporated by reference herein in its entirety, describes in the Abstract thereof a method of making a solvent based ink formulation which includes a thermochromic pigment, wherein the pigment being formed of microcapsules, includes drying a slurry that contains the pigments to a solids concentration between 70% and 99%, mixing the dried slurry in an appropriate mixing base, and adding any desired ink components to the base formulation. Each microcapsule contains a reversible thermochromic coloring material which exhibits a visible change in color between a first color state and a second color state in response to a change in temperature. Acceptable ink components include a gel vehicle, a free flow vehicle, a drying agent, a lithographic varnish, an ink wax, a polyester vehicle, a polyglycol solvent, a colloidal dispersion of resin in water, and a defoamer.

Leuco dye compositions are limited to certain types of dyes that can change color, namely triphenyl methanes (for example, Crystal Violet Lactone), xanthenes (for example, N-102 fluoran), and thiazines (for example, Benzoyl Leuco Methylene Blue). These dyes provide limited options for colors and have cost limitations. For example, the widely used crystal violet lactone dye can only produce one color transition, namely blue to colorless, when the temperature increases. This type of dye is not suitable for many applications when a color transition needs to be colorless to colored when the temperature increases. Previous solutions to the limited choice of colors relied on mixing of several dyes that require a background layer of one dye and a top layer of the thermochromic dye. U.S. Pat. No. 8,569,208, which is hereby incorporated by reference herein in its entirety, describes in the Abstract thereof color change compositions that transition from a first to a second color state upon application of an applied stimulus, substrates having the composition on a surface thereof, as well as methods of making and using the compositions.

Such an approach may still have limitations since the actual color change is still determined by the limited number of available thermochromic dyes.

In addition, the leuco dye thermochromic systems require a developer in order to generate the color of the dye by intermolecular interactions between the dye and developer at an activation temperature. At other temperatures, there is no interaction between the dye and developer and hence the color disappears. However, the most commonly used developer is Bisphenol A, which may pose health concerns and may require replacement in certain products. Therefore, new thermochromic systems with alternative developers or without developers are desired.

Thus, a need remains for improved color changing thermochromic compositions. Further, a need remains for improved color changing compositions that do not require mixing of multiple dyes. Still further, a need remains for improved color changing compositions that are cost effective. Still further, a need remains for color changing compositions that can provide multiple color options that can be selected for various applications and products. Still further, a need remains for color changing compositions that can be tuned to the desired application, such as selection of types of color changes and activation temperatures.

The appropriate components and process aspects of each of the foregoing U. S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a thermochromic composition comprising a dye molecule; a matrix, wherein the matrix comprises a material having a defined melting point; and an optional developer.

Also described is a process for preparing a thermochromic composition, comprising providing a dye; heating a matrix above its melting point; adding the heated matrix to the dye until the dye dissolves in the matrix; optionally, adding a developer; wherein the thermochromic composition exhibits a first color at a first temperature and a second color at a second temperature; wherein the first color and the second color are different; and wherein the first temperature and the second temperature are different.

DETAILED DESCRIPTION

Described herein is a composition comprising thermochromic dyes that change color when heated or cooled to a pre-determined activation temperature and a process for preparing the composition. A significant advantage of the present thermochromic composition is that pH-sensitive dyes can be transformed into temperature-sensitive systems with a variety of colors and color transitions. Thus, the composition and process herein provide a simple approach to produce a variety of thermochromic dyes from readily available commercial starting materials. The thermochromic dye system can be prepared by simply mixing together a dye molecule (for example, phenol red), a matrix (for example, 1-dodecanol), and optionally, a developer (for example, tributylamine).

In embodiments, a thermochromic composition herein comprises a dye molecule; a matrix, wherein the matrix comprises a material having a defined melting point; and, optionally, a developer.

Dye molecules for the present embodiments can include any suitable or desired dye molecule. Suitable dye molecules can be chosen from commercially available pH-sensitive molecules and pH indicators. In embodiments, the dye molecule is selected from the group consisting of a pH sensitive molecule, a pH indicator, and combinations thereof.

In embodiments, the dye molecule is selected from the group consisting of Gentian violet, Malachite green, Thymol blue, Methyl yellow, Bromophenol blue, Congo red, Methyl orange, Bromocresol green, Methyl red, Methyl purple, Azolitmin red, Bromocresol purple, Metacresol Purple, Bromothymol blue, Phenol red, Neutral red, Naphtholphthalein, Cresol red, Cresolphthalein, Phenolphthalein, Thymolphthalein, Alizarine Yellow, Indigo carmine, and combinations thereof. In certain embodiments, the dye molecule is selected from the group consisting of Phenol red, Methyl red, Cresol red, Bromothymol blue, Thymol blue, Metacresol purple, Phenolphthalein, Thymolphthalein, and combinations thereof.

Matrices selected for the present embodiments can include any suitable or desired matrix material having a defined melting point. In embodiments, the matrix is a material having the characteristic that the matrix dissolves the dye molecule at a temperature above the activation temperature of the thermochromic substance. If the dye is insoluble in the matrix, then no color change occurs because the dye remains as an isolated powder. In embodiments, activation temperature as used herein means the temperature at which the thermochromic composition changes from a first color to a second color that is different from the first color.

Suitable matrices include substances with a defined melting point that melt and solidify at a specific temperature. In embodiments, the matrix is a wax or an oily substance. In embodiments, the matrix is a wax. In embodiments, the matrix is selected from the group consisting of alkyl alcohols, alkyl esters, alkyl amines, alkyl acids, alkyl hydrocarbons, glycols, and combinations thereof, wherein the alkyl chain is saturated or unsaturated.

In certain embodiments, the matrix is selected from the group consisting of tert-butanol, 1-decanol, 1-dodecanol, 1-tetradecanol, 1-hexadecanol, 1-octadecanol, 1,10-decanediol, 1,12-dodecanediol, glycerol, poly(ethylene glycol), and combinations thereof.

The thermochromic compositions herein further optionally include a developer. The developer can be any suitable or desired material that modifies the pH of the thermochromic composition. Suitable developers include molecules that modify the pH of the thermochromic mixture. In embodiments, the developer is selected from the group consisting of triethylamine, triethanolamine, tributylamine, xylylenediamine, aniline, derivatives thereof, and combinations thereof.

Most of the suitable developers are organic molecules that are soluble and compatible with non-polar matrices.

In certain embodiments, the thermochromic composition contains only two components, without a separate developer molecule. In these embodiments, comprising dye and matrix, without a separate developer, the matrix, in embodiments, acts as both matrix and developer, thus eliminating the need for a separate, distinct developer component. Thus, in embodiments, the composition contains two components, the matrix and the dye, and is free of an additional developer.

In embodiments, the thermochromic composition is encapsulated.

Further described herein is a method for development of thermochromic dye mixtures that provides a simple process for determining the necessary ratios of components required to generate color changes of different dyes when exposed to different temperatures.

Thermochromic dye systems are typically composed of three ingredients: (1) dye molecule, (2) matrix, and (3) developer. Appropriate ratios of the three components are necessary to generate a mixture that changes color at a pre-determined temperature. Therefore, finding and testing three different components and multiple ratios can be a time-consuming process. The method herein provides a fast and simple way to generate new thermochromic mixtures by sequential and gradual addition of each component. The observer can visually determine the point at which sufficient quantity of each component is added, which is typically visible as a color change. This process is different from typical leuco dye thermochromic preparation procedures where all components are mixed together at the same time based on established ratios that can be difficult to determine for new components.

In embodiments, the process herein for preparing a thermochromic dye system by sequential and gradual addition comprises the following:

1. Dispense a dye molecule (for example, phenol red), at any suitable or desired amount, typically 0.1 gram;
2. Heat matrix (for example, 1-dodecanol) above its melting point, which can be any suitable or desired temperature above the melting temperature of the matrix, in embodiments to a temperature that is about 20° C. above the melting point of the matrix;
3. Gradually add the heated matrix to the dye under stirring at elevated temperature until the dye dissolves in the matrix, typically 5-10 grams; and
4. Add a developer, (for example, tributylamine) until the mixture changes color, typically 0.1-0.5 gram.

The resulting mixture typically has a certain color, color 1, in step 3 and a different color, color 2, in step 4. Typically, when the final mixture from step 4 is cooled, it changes color from color 2 to color 1. When the same mixture is heated up again, it changes color from color 1 to color 2. The activation temperature of the color change is equal to or similar to the melting point of the matrix used. In this way, matrices with different melting points can be used to achieve the desired activation temperature for the color change of the thermochromic mixture.

Thus, in embodiments, a process herein for preparing a thermochromic composition comprises providing a dye; heating a matrix above its melting point; adding the heated matrix to the dye until the dye dissolves in the matrix; optionally, adding a developer; wherein the thermochromic composition exhibits a first color at a first temperature and a second color at a second temperature; wherein the first color and the second color are different; and wherein the first temperature and the second temperature are different. In further embodiments, the process further comprises encapsulating the thermochromic composition to form an encapsulated thermochromic composition.

The thermochromic composition can be encapsulated by any suitable or desired process. In embodiments, the thermochromic composition can be further encapsulated with a shell composed of polymer or silica. Encapsulation can be conducted by coacervation, interfacial polymerization, or sol-gel process with silica. In embodiments, a thermochromic composition is encapsulated with silica via a sol-gel process using tetraethylorthosilicate precursor.

In some embodiments, the thermochromic compositions contain two components and are free of a separate developer component. In other embodiments, a developer is included, and the process herein includes adding the developer until the mixture changes color.

In embodiments, the composition comprises a thermochromic composition having a color change activation temperature; and wherein the activation temperature of the color change is equal to or substantially similar to the melting point of the matrix; and the matrix or a combination of matrices are selected to provide the thermochromic composition with a desired activation temperature.

The thermochromic compositions herein can be deposited by any suitable or desired process including manual deposition of the composition, such as by pipetting, or other process. In embodiments, the compositions herein comprises ink compositions which can be employed in any suitable or desired printing process. A process herein comprises providing the present thermochromic composition; depositing the composition onto a substrate to form deposited features, an ink image, or a combination thereof. The printing process can comprise a digital printing process including an ink jet printing process, an aerosol printing process, or a pneumatic aerosol printing process. In embodiments, the process further comprises treating, in embodiments, applying a stimulus to the deposited composition on the substrate wherein the thermochromic composition has the characteristic of color change after application of the stimulus, in embodiments, wherein the stimulus comprises a change in temperature. The process can also comprise other methods of treating the deposited features on the substrate including applying a stimulus by any suitable or desired method.

In embodiments, a process herein comprises providing a thermochromic composition comprising a dye molecule; a matrix, wherein the matrix comprises a material having a defined melting point; and optionally, a developer; disposing the thermochromic composition onto a substrate, wherein disposing the thermochromic composition optionally comprises ink jet printing the composition; wherein the thermochromic composition exhibits a first color at a first temperature and a second color at a second temperature; wherein the first color and the second color are different; and wherein the first temperature and the second temperature are different. In certain embodiments, the thermochromic compositions are specifically suitable for ink jet printing.

The substrate upon which the composition herein is deposited may be any suitable substrate including silicon, glass plate, plastic film, sheet, fabric, or paper. For structurally flexible devices, plastic substrates such as polyester, polycarbonate, polyimide sheets, and the like, may be used. In embodiments, the substrate is a polyethylene naphthalate substrate. The thickness of the substrate can be any suitable thickness such as about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

Any further suitable substrate, recording sheet, or removable support, stage, platform, and the like, can be employed for depositing the thermochromic compositions herein, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Elite Gloss, Sappi Warren Papers LUSTROGLOSS®, and the like, transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like. In embodiments, the substrate is selected from the group consisting of transparency materials, fabrics, textile products, plastics, polymeric films, glass, glass plate, metal, wood, wax, salt, folded paperboard, Kraft paper, and combinations thereof. transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like.

In certain embodiments, the compositions herein are deposited onto any suitable or desired substrate to form any suitable or desired product. In embodiments, the product formed with the compositions herein can comprise a member of the group consisting of food packaging, food labels, electronic devices, electronic packaging, electronic labels, medical devices, medical labels, test strips, sensors, labels, and the like, and combinations thereof.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Multiple color-changing thermochromic compositions have been prepared according to the method described herein comprising (1) dispensing a dye molecule, (2) heating a matrix above its melting point, (3) gradually adding the heated matrix to the dye under stirring at elevated temperature until the dye dissolves in the matrix, and (4) adding a developer until the mixture changes color. Table 1 provides example compositions. Table 2 shows activation temperatures and observed colors for the Examples 1-7 of Table 1.

TABLE 1

| Example | Dye | Dye Mass (grams) | Matrix | Matrix Mass (grams) | Developer | Developer Mass (grams) |
|---|---|---|---|---|---|---|
| 1 | Phenol Red | 0.10 | 1-Dodecanol | 10 | Tributylamine | 0.05 |
| 2 | Phenol Red | 0.10 | 1-Dodecanol | 10 | m-Xylylenediamine | 0.10 |
| 3 | Bromothymol Blue | 0.20 | Glycerol | 10 | m-Xylylenediamine | 0.10 |

TABLE 1-continued

| Example | Dye | Dye Mass (grams) | Matrix | Matrix Mass (grams) | Developer | Developer Mass (grams) |
|---|---|---|---|---|---|---|
| 4 | Bromothymol Blue | 0.10 | 1-Decanol | 10 | Tributylamine | 0.50 |
| 5 | Bromothymol Blue | 0.10 | Tert-butanol | 10 | m-Xylylenediamine | 0.10 |
| 6 | Bromothymol Blue | 0.10 | 1-Decanol | 10 | None | None |
| 7 | Bromothymol Blue | 0.10 | 1-Dodecanol | 10 | None | None |

TABLE 2

| Example | Activation Temperature (° C.) | Color Below Activation Temperature | Color Above Activation Temperature |
|---|---|---|---|
| 1 | 20 | Red | Yellow |
| 2 | (1) 5, (2) 20 | (1) Red, (2) Yellow | (1) Yellow, (2) Green |
| 3 | 20 | Green | Yellow |
| 4 | 5 | Brown | Yellow |
| 5 | (1) 5, (2) 20 | (1) Blue, (2) Green | (1) Green, (2) Yellow |
| 6 | 5 | Red | Yellow |
| 7 | 20 | Red | Yellow |

Dye compositions with two components and without a separate developer.

Certain molecules, such as primary alcohols, can elicit a color change of a thermochromic mixture without the need of adding a separate developer. Therefore, two component systems consisting of a dye molecule and matrix can manifest a color change when temperature is varied above or below the melting point of the matrix. Specifically, Example 6 has only two components, bromothymol blue and 1-decanol, and the example exhibits a color change from red (below 5° C.) to yellow (above 5° C.). The activation temperature can be adjusted by selecting a suitable matrix with a desired melting point. Specifically, Example 7 has the same color change as Example 6 occurring at a higher temperature, 20° C. The two component thermochromic systems are particularly useful for applications where toxicity of the chemical components is a concern, such as food packaging. Some developer compounds used in thermochromics may pose health concerns, such as Bisphenol A. Therefore, two component systems present an advantage both in terms of cost and toxicity standpoints. Thus, in embodiments, the thermochromic compositions herein are free of Bisphenol A.

Dye compositions with multiple color transitions at multiple temperatures.

Certain developers can interact with pH-sensitive dyes to render more than one color change. In particular, Example 2 provides a composition exhibiting a color change from red to yellow and from yellow to green as the sample is heated from below 5° C. to above 20° C. Multiple color changes can occur with other dyes, as in Example 5 where the mixture of bromothymol blue, tert-butanol, and m-xylylenediamine exhibits a color change from blue to green to yellow as it is heated from below 5° C. to above 20° C.

Encapsulation of thermochromic dyes. In embodiments, thermochromic dyes can be encapsulated, for example in order to stabilize and protect sensitive molecules from interference of other components that are typically added into inks and other products.

Example 8

Encapsulation of Thermochromic Dye Mixture.

A thermochromic dye mixture was prepared by combining 0.1 gram of bromothymol blue, 10 grams of 1-decanol and 0.5 gram of tributylamine by stirring vigorously at 40° C. for 30 minutes. This mixture was encapsulated inside silica particles by sol-gel process. The silica precursor was prepared by combining 0.5 gram tetraethyl orthosilicate with 30 milliliters of ethanol and 10 milliliters of water under vigorous stirring. Then 1.0 gram of $NH_4OH$ (29% aqueous solution) was added and stirred vigorously. Then 0.5 gram of thermochromic dye mixture in 10 milliliters of ethanol was added into the silica precursor and stirred for 24 hours. The resulting product was filtered and dried. The resulting powder exhibited a color change from brown to yellow upon heating.

The encapsulated thermochromic dye mixtures can be added into a variety of commercial products, such as ink formulations.

Thus, provided herein are color changing thermochromic dye compositions providing multiple color options and methods for preparing the compositions. The color changing compositions are suitable for many applications including packaging and printing applications that require customized inks that exhibit a color change to indicate exposure to different temperatures. The compositions and methods herein provide many possible color options which can be selected to match the application or product requirements. The thermochromic compositions herein can be applied on to a product to provide an easy visual indicator of temperature. Advantageously, the color-changing properties of the thermochromic compositions can be tuned to the application, specifically, different types of color changes and different activation temperatures.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A thermochromic composition consisting of:
   a dye molecule, where the dye molecule is selected from the group consisting of Gentian violet, Malachite green, Thymol blue, Methyl yellow, Bromophenol blue, Congo red, Methyl orange, Bromocresol green, Methyl red, Methyl purple, Azolitmin red, Bromocresol purple, Metacresol Purple, Bromothymol blue, Phenol red, Neutral red, Naphtholphthalein, Cresol red, Cresolphthalein, Phenolphthalein, Thymolphthalein, Alizarine Yellow, Indigo carmine, and combinations thereof;

a matrix, wherein the matrix comprises a material having a defined melting point; optionally, wherein the matrix is a wax; where the matrix is selected from the group consisting of tert-butanol, 1-decanol, 1-dodecanol, 1-tetradecanol, 1-hexadecanol, 1-octadecanol, 1,10-decanediol, 1,12-dodecanediol, glycerol, poly(ethylene glycol), and combinations thereof;

wherein the composition contains two components, the matrix and the dye, and is free of a developer; and wherein the composition is encapsulated.

2. The composition of claim 1, where the dye molecule is selected from the group consisting of a pH sensitive molecule, a pH indicator, and combinations thereof.

3. The composition of claim 1, where the matrix is a wax.

4. The composition of claim 1, wherein the composition exhibits a first color at a first temperature and a second color at a second temperature;

wherein the first color and the second color are different; and wherein the first temperature and the second temperature are different.

5. The composition of claim 1, wherein the composition comprises a thermochromic composition having a color change activation temperature; and wherein the activation temperature of the color change is equal to the melting point of the matrix;

and wherein the matrix or a combination of matrices are selected to provide the thermochromic composition with a desired activation temperature.

6. The composition of claim 1, wherein the composition exhibits the characteristic of multiple color transitions at multiple temperatures.

7. A process for preparing a thermochromic composition, consisting of:

providing a dye, where the dye is selected from the group consisting of Gentian violet, Malachite green, Thymol blue, Methyl yellow, Bromophenol blue, Congo red, Methyl orange, Bromocresol green, Methyl red, Methyl purple, Azolitmin red, Bromocresol purple, Metacresol Purple, Bromothymol blue, Phenol red, Neutral red, Naphtholphthalein, Cresol red, Cresolphthalein, Phenolphthalein, Thymolphthalein, Alizarine Yellow, Indigo carmine, and combinations thereof;

heating a matrix above its melting point, where the matrix is selected from the group consisting of tert-butanol, 1-decanol, 1-dodecanol, 1-tetradecanol, 1-hexadecanol, 1-octadecanol, 1,10-decanediol, 1,12-dodecanediol, glycerol, poly(ethylene glycol), and combinations thereof;

adding the heated matrix to the dye until the dye dissolves in the matrix;

wherein the composition contains two components, the matrix and the dye, and is free of a developer;

encapsulating the thermochromic composition to form an encapsulated thermochromic composition;

wherein the thermochromic composition exhibits a first color at a first temperature and a second color at a second temperature;

wherein the first color and the second color are different; and wherein the first temperature and the second temperature are different.

8. The process of claim 7, wherein the composition comprises a thermochromic composition having a color change activation temperature; and wherein the activation temperature of the color change is equal to the melting point of the matrix;

and wherein the matrix or a combination of matrices are selected to provide the thermochromic composition with a desired activation temperature.

9. The process of claim 7, where the dye molecule is selected from the group consisting of a pH sensitive molecule, a pH indicator, and combinations thereof.

10. A process consisting of:

providing a thermochromic composition comprising a dye molecule; a matrix, wherein the matrix comprises a material having a defined melting point;

where the dye molecule is selected from the group consisting of Gentian violet, Malachite green, Thymol blue, Methyl yellow, Bromophenol blue, Congo red, Methyl orange, Bromocresol green, Methyl red, Methyl purple, Azolitmin red, Bromocresol purple, Metacresol Purple, Bromothymol blue, Phenol red, Neutral red, Naphtholphthalein, Cresol red, Cresolphthalein, Phenolphthalein, Thymolphthalein, Alizarine Yellow, Indigo carmine, and combinations thereof;

where the matrix is selected from the group consisting of tert-butanol, 1-decanol, 1-dodecanol, 1-tetradecanol, 1-hexadecanol, 1-octadecanol, 1,10-decanediol, 1,12-dodecanediol, glycerol, poly(ethylene glycol), and combinations thereof;

wherein the composition contains two components, the matrix and the dye, and is free of a developer;

wherein the composition is encapsulated;

disposing the thermochromic composition onto a substrate, wherein disposing the thermochromic composition optionally comprises ink jet printing the composition;

wherein the thermochromic composition exhibits a first color at a first temperature and a second color at a second temperature;

wherein the first color and the second color are different; and wherein the first temperature and the second temperature are different.

* * * * *